United States Patent
Reed

(10) Patent No.: US 6,637,145 B2
(45) Date of Patent: Oct. 28, 2003

(54) HOOK BAITING DEVICE

(76) Inventor: Charles R. Reed, 16872 M 60 E., Vandalia, MI (US) 49095

( * ) Notice: Subject to any disclaimer, the term of this patent is extended or adjusted under 35 U.S.C. 154(b) by 0 days.

(21) Appl. No.: 10/033,607

(22) Filed: Jan. 2, 2002

(65) Prior Publication Data

US 2003/0121199 A1 Jul. 3, 2003

(51) Int. Cl.$^7$ ................................................ A01K 97/00
(52) U.S. Cl. ............................................................. 43/4
(58) Field of Search ................................ 43/4, 1, 27.4

(56) References Cited

U.S. PATENT DOCUMENTS

| | | | | |
|---|---|---|---|---|
| 4,015,359 A | * | 4/1977 | Andrews | 43/4 |
| 4,083,477 A | * | 4/1978 | Zetterberg | 141/21 |
| 4,118,881 A | * | 10/1978 | McFarlane | 43/4 |
| 4,843,753 A | * | 7/1989 | Mace | 294/99.2 |
| 4,848,019 A | * | 7/1989 | Toogood | 43/4 |
| 5,735,071 A | * | 4/1998 | Gouldie et al. | 43/4 |

* cited by examiner

Primary Examiner—Kurt Rowan
(74) Attorney, Agent, or Firm—Walter D. Ames, Esq.

(57) ABSTRACT

A device for mechanically impaling a worm on a hook includes a housing enclosing a passageway that terminates in a bait receiving aperture and a hook receiving aperture. Application of suction within the passageway impels a worm at the bait receiving aperture toward and onto a hook located in the passageway at the hook receiving aperture.

15 Claims, 1 Drawing Sheet

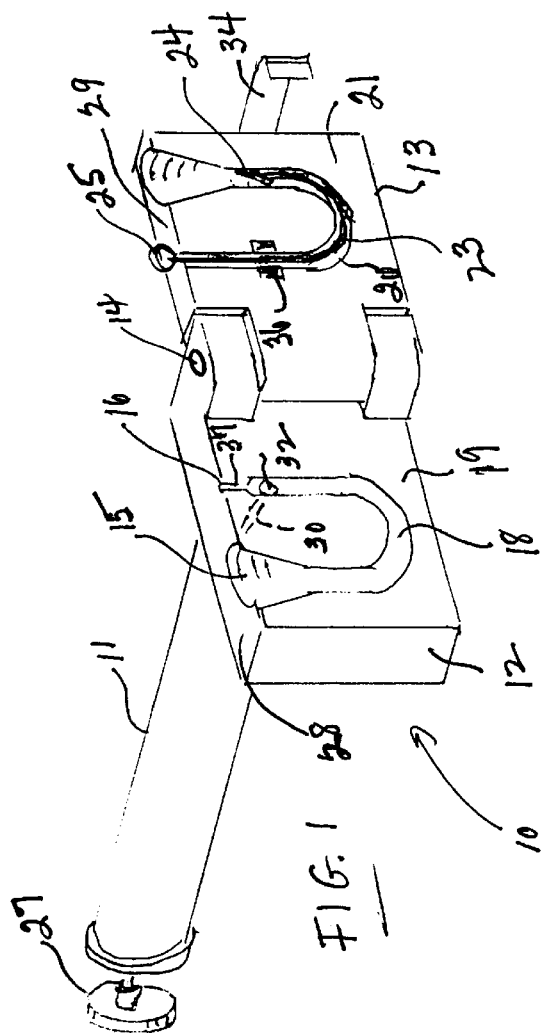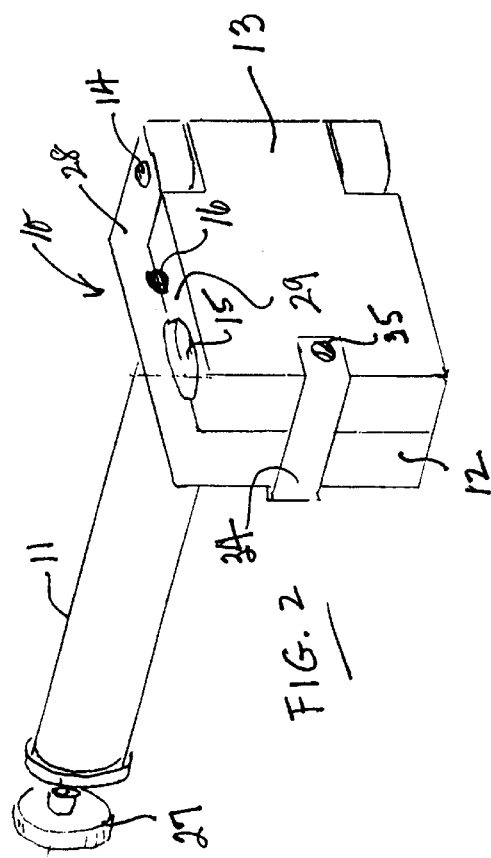

001
HOOK BAITING DEVICE

FIELD OF INVENTION

The present invention relates generally to devices for baiting fish hooks. More particularly it relates to such devices in which a hook can be baited without the necessity of a fisherperson holding a bait and manually impaling it on a hook.

BACKGROUND OF INVENTION

Particularly for those who may be inclined toward being squeamish, baiting a hook has long been an undesirable aspect of fishing with live bait. Whether the bait be a live minnow, or a worm such as a night crawler or bloodworm, the physical aspect of taking the squirming bait and impaling it on a hook is certainly not considered a desirable aspect of fishing. Yet, when live bait is being used, as contrasted with the use of an inanimate lure, the effort of taking a worm, for example, and threading or otherwise putting a fishing hook through it so that it will remain firmly on the hook yet present a lifelike appearance to the potential predator is a necessity.

It is to overcome this problem—the necessity of human intervention in baiting a hook with live bait—that is the primary object of the present invention. Expressed otherwise, it is the principal object of my invention to provide a device for baiting a fishing hook with live bait, and particularly but not necessarily limited to a live worm, through the operation of which a hook may be baited without the necessity of a fisherperson's actually impaling the worm on the hook.

SUMMARY OF INVENTION

In its broader aspect, my invention comprises a device for impaling bait on a hook, in which there is a housing having a continuous passageway formed within it, the passageway extending from one surface of the housing to another or the same surface. Where the passageway terminates at a housing surface it forms two orifices, one for receiving a hook and the other for receiving bait. Means for applying suction within the passageway is located near the hook receiving aperture, so that when bait is located in the passageway near the bait receiving aperture and a hook is located in the passageway near the hook receiving aperture, suction impels the bait through the passageway toward the hook and impales the bait on the hook without the necessity of human intervention.

Among the several features of the above-summarized invention is that the hook can be held in bait-receiving position by a magnet, as the hook is normally ferromagnetic. Also, it has been found convenient to have the hook extend outwardly beyond the hook receiving aperture, and to enable bait to be more easily inserted in the bait receiving aperture, to have that aperture flared to form a funnel.

Regarding the means for applying suction within the passageway in the housing, it has been found most convenient to have the suction applied by a suction pump mounted in a side wall of the housing. Suction is exerted through an orifice in the side wall that extends into the passageway to a location adjacent or near the hook receiving aperture, so that the suction will be drawn through a majority of the passageway and, in particular, from the bait receiving aperture toward the orifice in the passageway. In this manner bait located at the bait receiving aperture will be drawn into the passageway and through it in the direction of the orifice near the hook receiving aperture, thereby impaling the bait on the hook.

Another feature of the present invention involves the structure of the housing of the device. It has been found advantageous to construct the housing in two parts that are pivotally connected to each other. Each of the parts has an inner surface with an elongated groove in it. When the two parts are in mating position with their inner surfaces contiguous with each other, the grooves are juxtaposed such that they form a passageway in which the hook and bait can be located. By this construction the housing parts can be swung into open position when it is desired to insert a hook into the passageway and to clean the device, yet brought into and locked in closed position when the device is to be operated.

These and other objects, features and advantages of my invention will become more apparent when considered in connection with a preferred embodiment of my invention as illustrated in the accompanying drawing, in which:

FIG. 1 is a perspective view of the device as assembled, with the two housing parts in open position, and FIG. 2 is the same perspective view with the housing parts in closed position.

DETAILED DESCRIPTION OF PREFERRED EMBODIMENT

Referring now to the drawings, and to both FIGS. 1 and 2 thereof, the hook baiting device is basically formed from a housing, identified generally by arrow 10, to which is connected a suction pump 11. Housing 10 is comprised of two parts, a first part 12 to which suction pump 11 is attached, and a second part 13, swingably connected to the first part by a conventional pivot pin 14. In closed position as viewed in FIG. 2, the interior of the housing is not apparent, but what is seen is the bait receiving aperture 15, which is flared so that bait may be more easily inserted within it, and a hook receiving aperture 16, which is of lesser diameter because it is only required that the diameter of the aperture be slightly greater than the diameter of the hook.

The internal structure of the housing that enables the apparatus to function is best illustrated in FIG. 1. It will there be seen that the first housing part 12 is formed with an elongated groove 18 in its interior surface 19. In a like manner the second housing part 13 has a groove 20 cut into its inner surface 21. When the housing parts 12 and 13 are pivoted into closed position, the aligned grooves 18 and 20 in their respective interior surfaces 19 and 21 are juxtaposed to form an elongated passageway terminating in the bait receiving, flared aperture 15 and a hook receiving aperture 16, as seen in FIG. 2. Both of these apertures terminate in an upper surface of the housing, which surface is formed by the upper surfaces 28 and 29 of the first and second housing parts, respectively.

With the two housing parts in open position as viewed in FIG. 1, the location of a hook 23 in the groove 18 in the first housing part 12 is shown. Hook 23 is of standard construction with a barbed end 24 on which bait is to be impaled, and a looped end 25 adapted to connect the hook to a line or other fishing device. As mounted in the first part groove 18, which will become a passageway when the housing parts are closed, in this preferred embodiment the loop end 25 of the hook 23 extends somewhat beyond the hook receiving aperture 16, so that once the hook has been baited using the present device, it can be more readily removed from my device. As the passageway and the grooves 18 and 20 from which it is formed are of a U-shape, the conventional hook 23 is also U-shaped. Thus, the lower U-shaped portion of the hook will correspond with the lower portion of the U-shape of the passageway so that the hook 23 lies in the passageway as seen in FIG. 1. If the hook is ferromagnetic, it is maintained in position in the passageway by a magnet 36.

Suction is applied within the passageway by means of a suction pump 11, which is activated by a handle 27, which is pulled to apply suction. The pump 11 is connected and sealed to the first housing part 12 and an orifice indicated by broken lines 30 extends through the first housing part 12 and into the passageway formed by the groove 18 at an opening 32. Opening 32 may be located at various places within the groove 18, but is preferably positioned adjacent to, that is, near or close to but spaced from the hook receiving aperture 16 in upper housing surface 28. Also, in order to maintain the two housing parts in closed position, a security strap 34 held by a rivet 35 on housing 13 extends about both the first and second housing parts and adheres to the first part 12 by suitable adhesive or other means.

In use the device is brought to an open position in which the second housing part 13 is pivoted about pin 14 to expose the grooves 18 and 20. A hook 23 is then inserted in groove 20 in second housing part 13 to a position in which the barbed end 24 points toward the upper surface 29 of the second part. The ferromagnetic hook is maintained position by a magnet 36. Then the housing 10 is brought to a closed position as shown in FIG. 2 and is secured in that position by strap 34.

After the housing is closed, a worm or other bait is fed into the bait receiving aperture 15 to a location in which the worm is positioned to enter the passageway formed by grooves 18 and 20. Then the suction pump 11 is activated by pulling the handle. 27 away from the cylinder to draw a suction, at that time pulling the worm into the passageway and onto the barbed end 24 of hook 23, and suction is maintained until the worm has been threaded onto the hook to the desired degree. Suction to pull the worm in the direction of the opening 32 of the passageway is assisted by the provision of a restricted portion 37 of the groove 18 adjoining the hook receiving aperture 16. Such restriction is designed to enable the suction to pull air from the bait receiving aperture 15 rather than the hook receiving aperture 16. Thereafter suction ceases, the housing is brought to the open position substantially as shown in FIG. 1, and the baited hook removed from the groove 20 in the second housing part 13 by the loop end 25 of the hook 23. Hook 25 is then attached to a line or, more likely, it is already so attached so that when the baited hook is removed from the passageway in the housing, it will be ready for immediate use at that time.

By virtue of the device a preferred embodiment of which has been described hereinbefore, only minimal manual contact with a worm or other bait is necessitated, and what is particularly avoided is threading a live worm onto a hook, much to the discomfort of the worm and the person who is doing the threading. While the former discomfort cannot be avoided by use of my device, the unpleasantness visited on the person doing the baiting is largely avoided.

It will be apparent to those of skill in this art that many alterations and modifications of the preferred embodiment of my invention will be obvious without departing from the spirit of the invention. As to all such obvious changes, it is desired that they be included within the purview of my invention, which is to be limited only by the scope, including equivalents, of the following, appended claims.

I claim:

1. A device for impaling bait on a hook, comprising a housing having an upper surface and a planar side surface, said housing being constructed with a passageway extending continuously from and terminating at said upper surface to form at said upper surface one aperture for receiving bait and another aperture for receiving a hook to be baited, and means for applying suction to said passageway at a location adjacent to said hook receiving aperture, so that when a bait is located at said bait receiving aperture, and a hook is located in said passageway adjacent to said hook receiving aperture, the application of suction by said suction means will impel the bait through said passageway in the direction of the hook and impale the bait on the hook without the necessity of manual intervention.

2. A device as claimed in claim 1, in which said hook is ferromagnetic and is maintained in position in said passageway by a magnet mounted on the wall of said passageway.

3. A device as claimed in claim 1, in which when said hook is located in said passageway, its non-barbed portion extends outwardly from said hook receiving aperture beyond the plane of said upper body surface.

4. A device as claimed in claim 1, in which said bait receiving aperture is flared to form a funnel into which the bait is introduced into said passageway.

5. A device as claimed in claim 1, in which said suction means is mounted on said housing side surface.

6. A device as claimed in claim 1, in which said suction means extends through said side surface into an orifice in said housing and through said orifice into said passageway at a location spaced from but near to said bait receiving aperture.

7. A device as claimed in claim 1, in which said suction means is a handheld suction pump.

8. A device for impaling bait on a hook, comprising a housing formed of a first part and a second part pivotally connected to each other, each of said parts having an inner surface shaped to mate with the inner surface of the other of said parts, and exterior surfaces that together form a unitary housing, said inner surface of said first part having a groove formed therein and extending along said inner surface and having two groove ends that terminate at said exterior surface of said housing, said inner surface of said second part also having a groove formed therein and extending along said inner surface and having two groove ends that terminate at an exterior surface of said housing, said first and second body parts being pivotally connected to each other at a location spaced from said grooves and being moveable between an open position in which access to said grooves is provided at said inner surfaces, and a closed position in which said interior surfaces of said first and second parts are located in contiguous relationship and said grooves are juxtaposed to form a passageway extending within said body and terminating at said exterior housing surface in a hook receiving aperture and a bait receiving aperture, and means for applying suction to said passageway at a location adjacent to said hook receiving aperture, so that when bait is located in said passageway at said bait receiving aperture and a hook is located in said passageway at said hook receiving aperture, the application of suction by said suction means will impel the bait through said passageway in the direction of the hook and impale the bait on the hook without the necessity of manual intervention.

9. A device as claimed in claim 8, in which said hook is ferromagnetic and is maintained in position in said passageway by a magnet mounted on the wall of said passageway.

10. A device as claimed in claim 8, in which said bait is a worm that is introduced into said passageway through said bait receiving aperture.

11. A device as claimed in claim 8, in which said hook can be placed in said groove in one of said housing parts, and removed from said housing part, when said housing parts are in open position.

12. A device as claimed in claim 8, in which said passageway is generally U-shaped and said hook receiving aperture and said bait receiving aperture lie in the same plane of said surface of said body.

13. A device as claimed in claim 12, in which said hook has a barbed end and a looped end, and said looped end extends beyond said surface of said housing when said hook is mounted in said passageway.

14. A device as claimed in claim 13, in which said barbed end extends within said passageway beyond the arcuate portion of said U-shaped passageway and in the direction of said bait receiving aperture when said hook is mounted in said passageway.

15. A device as claimed in claim 8, further comprising means to releasably lock said first and second housing parts in closed position.

* * * * *